United States Patent
Yaung et al.

(10) Patent No.: US 9,201,878 B2
(45) Date of Patent: Dec. 1, 2015

(54) OBJECT-ORIENTED SYSTEMS AND METHODS FOR REMOTELY CONTROLLING STORAGE MANAGEMENT SERVICES

(75) Inventors: Alan Tsu-I Yaung, San Jose, CA (US); Ganesh Vaideeswaran, San Jose, CA (US); Francisco J. Bermudez, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 1223 days.

(21) Appl. No.: 12/056,730

(22) Filed: Mar. 27, 2008

(65) Prior Publication Data

US 2009/0248795 A1  Oct. 1, 2009

(51) Int. Cl.
  *G06F 17/30* (2006.01)

(52) U.S. Cl.
  CPC .............................. *G06F 17/30011* (2013.01)

(58) Field of Classification Search
  CPC .......... H04L 67/16; G06F 11/00; G06F 17/30
  USPC ................... 709/223, 221, 224, 220
  See application file for complete search history.

(56) References Cited

U.S. PATENT DOCUMENTS

| | | | |
|---|---|---|---|
| 6,327,611 B1* | 12/2001 | Everingham | 709/206 |
| 6,332,163 B1* | 12/2001 | Bowman-Amuah | 709/231 |
| 7,028,312 B1* | 4/2006 | Merrick et al. | 719/330 |
| 7,054,877 B2 | 5/2006 | Dettinger et al. | |
| 7,209,919 B2 | 4/2007 | Ho et al. | |
| 2002/0019908 A1* | 2/2002 | Reuter et al. | 711/112 |
| 2004/0049590 A1* | 3/2004 | Collier et al. | 709/230 |
| 2005/0005276 A1 | 1/2005 | Morgan | |
| 2005/0193097 A1* | 9/2005 | Guthrie et al. | 709/219 |
| 2005/0286540 A1 | 12/2005 | Hurtta et al. | |
| 2006/0095921 A9 | 5/2006 | Wang et al. | |
| 2006/0129605 A1* | 6/2006 | Doshi | 707/104.1 |
| 2006/0129971 A1* | 6/2006 | Rojer | 717/104 |
| 2006/0218127 A1 | 9/2006 | Tate et al. | |
| 2007/0124467 A1 | 5/2007 | Glassco et al. | |
| 2007/0150574 A1 | 6/2007 | Mallal et al. | |
| 2007/0201665 A1 | 8/2007 | Kocan et al. | |
| 2007/0220248 A1 | 9/2007 | Bittlingmayer et al. | |
| 2008/0046482 A1* | 2/2008 | Oh et al. | 707/203 |

* cited by examiner

*Primary Examiner* — Shaq Taha
(74) *Attorney, Agent, or Firm* — Farrokh Pourmirzaie; Edell, Shapiro & Finnan, LLC

(57) ABSTRACT

A method and system employing an object-oriented approach to remotely controlling storage management services in a content management system. An Application Programming Interface (API) is used to communicate between a system administrator client and a resource manager, so that a system administrator can, e.g., start and stop services, check the status of services, etc. The API and resource manager exchange information, for example by exchanging XML documents by HTTP posting.

24 Claims, 3 Drawing Sheets

OBJECT-ORIENTED SYSTEMS AND METHODS FOR REMOTELY CONTROLLING STORAGE MANAGEMENT SERVICES

BACKGROUND OF THE INVENTION

1. Technical Field

The present invention relates generally to a content management system, and more particularly to object-oriented systems and methods for controlling storage management services in a content management system.

2. Discussion of Related Art

A content management system is a system that can typically manage all types of electronic data objects including, for example, HTML and XML Web content, document images, office documents, e-mail messages, textual data, printed output, audio, video, and other digital representations of information (collectively referred to herein as "documents"). A content management system is frequently a web application used for managing websites and web content, though in many cases, content management systems require special client software for editing and constructing resources.

Conventional content management systems typically include a library server, one or more resource managers, and a client access Application Program Interface (API). The library server stores metadata relating to all documents stored in the resource manager, and also controls the particular documents that a particular client user can access. The resource manager is where the actual document or a pointer to the actual document is stored, and it utilizes a variety of services for storage management. Through the client API, the end user's application program can store, search for, and mark-up documents in the content management system, by accessing the library server and the resource manager.

In conventional content management systems, a system administrator wishing to manually start, stop, or check the status of the resource manager's services must physically access the machine hosting the resource manager. This physical access can lead to problems, such as the inability to separate system administrators managing the resource manager from system administrators managing the machine hosting the resource manager, and potential security concerns depending on the sensitivity of the data stored by the resource manager.

SUMMARY OF THE INVENTION

Accordingly, embodiments of the present invention include a method of remotely administering storage management services in a content management system, comprising providing a system administration class that defines an administration method capable of acting on a storage management service in a server, generating, responsive to a request from a client, an extensible markup language (XML) request document naming the administration method, the storage management service, and an action to be taken on the service, and sending the XML request document to the server. The embodiments further include a program product apparatus and a system for remotely administering storage management services as described above.

Other embodiments of the present invention include a system for managing electronic information, comprising a resource manager for storing electronic information and performing a service to manage stored electronic information, a system administration client for administering the service, an application program interface for communicating between said system administration client and said resource manager, wherein the application program interface is configured to send an extensible markup language (XML) request document naming an action to be taken on the service to the resource manager responsive to an administration request from the system administration client, and to receive an XML response document from the resource manager naming a result of the action.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION OF THE PREFERRED EMBODIMENTS

Figure 1:
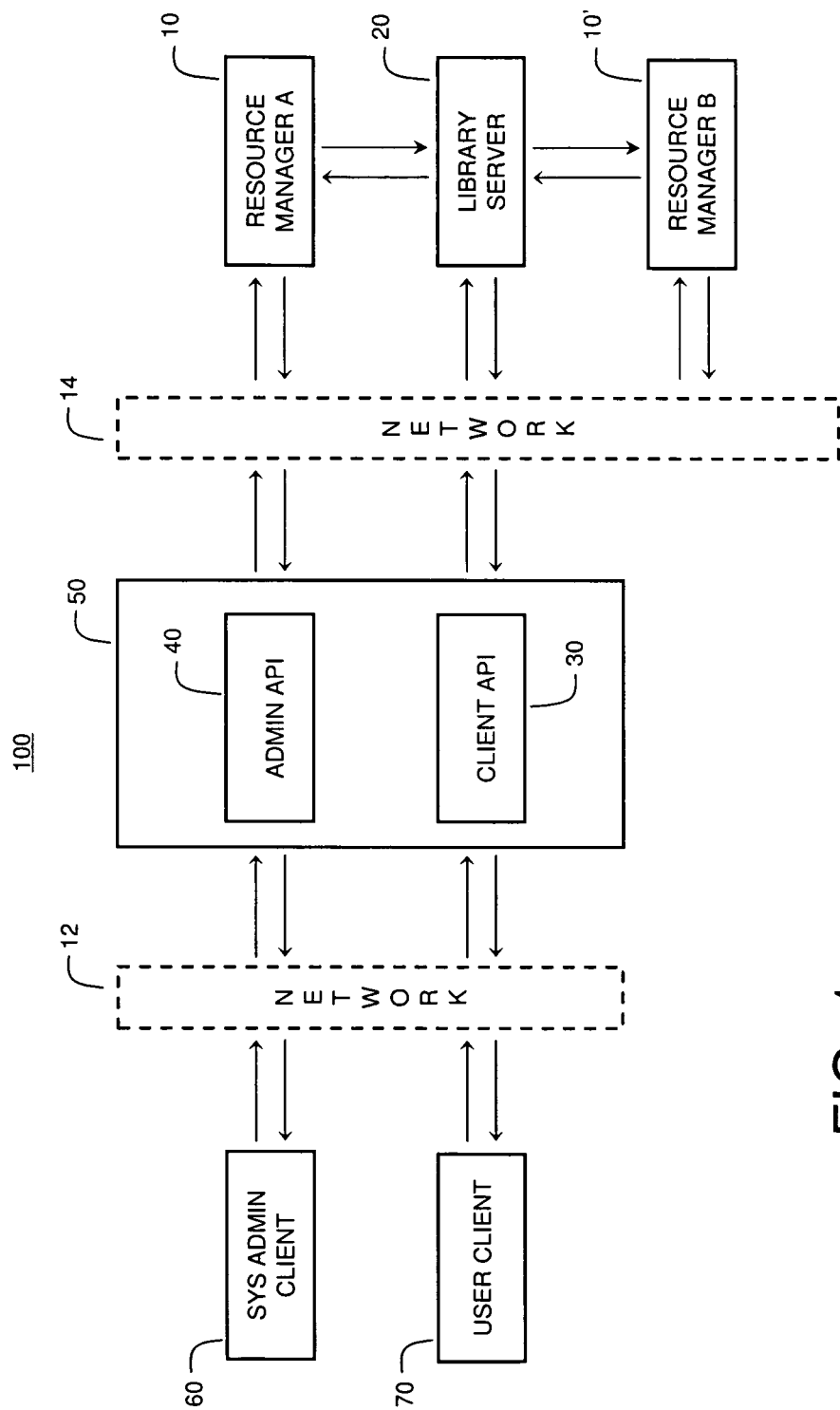
FIG. 1 is a block diagram of an exemplary content management system in accordance with an embodiment of the present invention.

Referring now to the figures, an exemplary content management system employing an object-oriented approach to remotely controlling storage management services according to an embodiment of the present invention is illustrated in FIG. 1. The system shown in FIG. 1 is particularly suited to delivery of content over a network or the Internet. A content management system 100 includes one or more resource managers, such as resource managers 10, 10', library server 20, client API 30, and system administration API (Admin API) 40, located on server 50. The resource managers 10, 10' are the repository for content (e.g., documents) stored in the content management system 100. Documents are stored in the resource managers 10, 10', and associated attribute data is stored on the library server 20. The system 100 may include additional servers, clients, and other devices not shown, and individual components of the system may occur either singly or in multiples, for example, there may be a single resource manager, two resource managers (as is shown in FIG. 1), or three or more resource managers in the system.

In operation, when one or more users of the content management system requests a document through the user client 70, the user client 70 communicates with the client API 30. Client API 30 then makes a call to the library server 20, requesting the location of the requested document. The library server 20 returns the location of the resource manager 10 where the document is stored, and a security token. The user client 70 uses the security token to obtain access to the document from the resource manager 10. If desired, the library server 20 may provide additional information, for example a timestamp indicating when the requested document was last updated on the resource manager 10, but this is not required for the system to operate.

In addition to storing documents in the content management system 100, the resource managers 10, 10' also perform storage management for the system, via the utilization of various services. It is sometimes desirable for a system administrator to manually start, stop, or check the status of various resource manager services, for example in order to improve performance of the system. Conventional content management systems require the system administrator to physically access the machine hosting the resource manager in order to perform such manual actions. The present system, however, provides advantages over conventional content management systems, in that the resource manager services can be administered remotely via system administrator client 60 and system administration API 40. Remote administration, for example, starting, stopping, and status checking services, is performed by a system administrator using the system administrator client 60. The system administrator client 60 communicates with the system administration API 40, which makes a call to the resource manager 10. Resource manager 10 responds to the call, and information (e.g., status) may be passed back through the system administration API 40 to the system administrator client 60, and thus to the system administrator.

Although FIG. 1 illustrates the system administrator client 60, user client 70, and the content management system 100 as distributed over two networks 12, 14, it should be appreciated that some or all of the clients and components of the content management system 100 may be running on the same or separate computers, and that one or more networks are optional. For example, although resource managers 10, 10' and library server 20 are shown as separated from client API 30 and system administration API 40 by a network 14, it should be understood that the APIs may reside on the same servers as the resource managers 10, 10' and library server 20, and that network 14 may be entirely absent. Likewise, it should be understood that one or more resource managers 10, 10' may reside on the same server as the library server 20, or that they may reside on separate servers, either individually or together.

In the depicted embodiment, the system administration API 40 is separated from the resource managers 10, 10' by a network 14. In this embodiment, and in other embodiments in which the components are distributed over multiple servers, the system components communicate using a suitable protocol, for example TCP/IP, HTTP, HTTP with Secure Socket Layer (SSL), FTP, RPC, UDP, and the like.

The resource managers 10, 10' and library server 20 may be implemented by any quantity of any type of conventional or other databases (e.g., relational, hierarchical, etc.) or storage structures (e.g., files, data structures, disk or other storage, etc.). The resource managers 10, 10' and library server 20 may store any desired information arranged in any fashion (e.g., tables, relations, hierarchy, etc.). The various server and user computer systems may implemented by any quantity of conventional or other computer systems or devices (e.g., computer terminals, personal computers (e.g., IBM-compatible, Apple, tablet, laptop, etc.), cellular telephone, personal data assistant (e.g., Palm Pilot, Treo, etc.), etc.) and may include any commercially available operating system (e.g., Windows, OSX, Unix, Linux, etc.) and any commercially available or custom software (e.g., browser software, communications software, word processing software, etc.). These systems may include types of displays and input devices (e.g., keyboard, mouse, voice recognition, etc.) to enter and/or view information.

Figure 2:
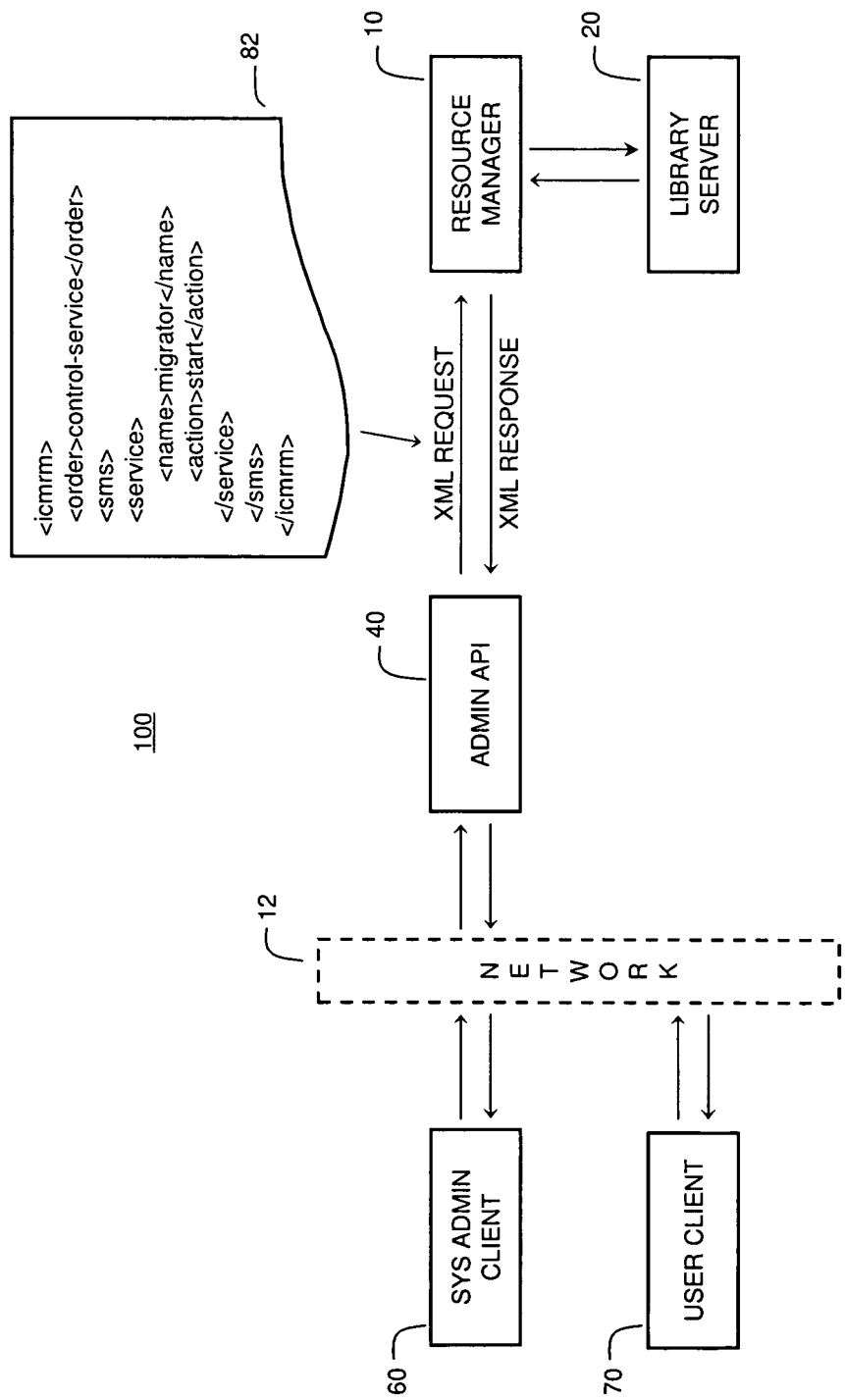
FIG. 2 is an exemplary implementation of an object-oriented method for controlling storage management services that may be used in the system of FIG. 1 in accordance with an embodiment of the present invention.
Figure 3:
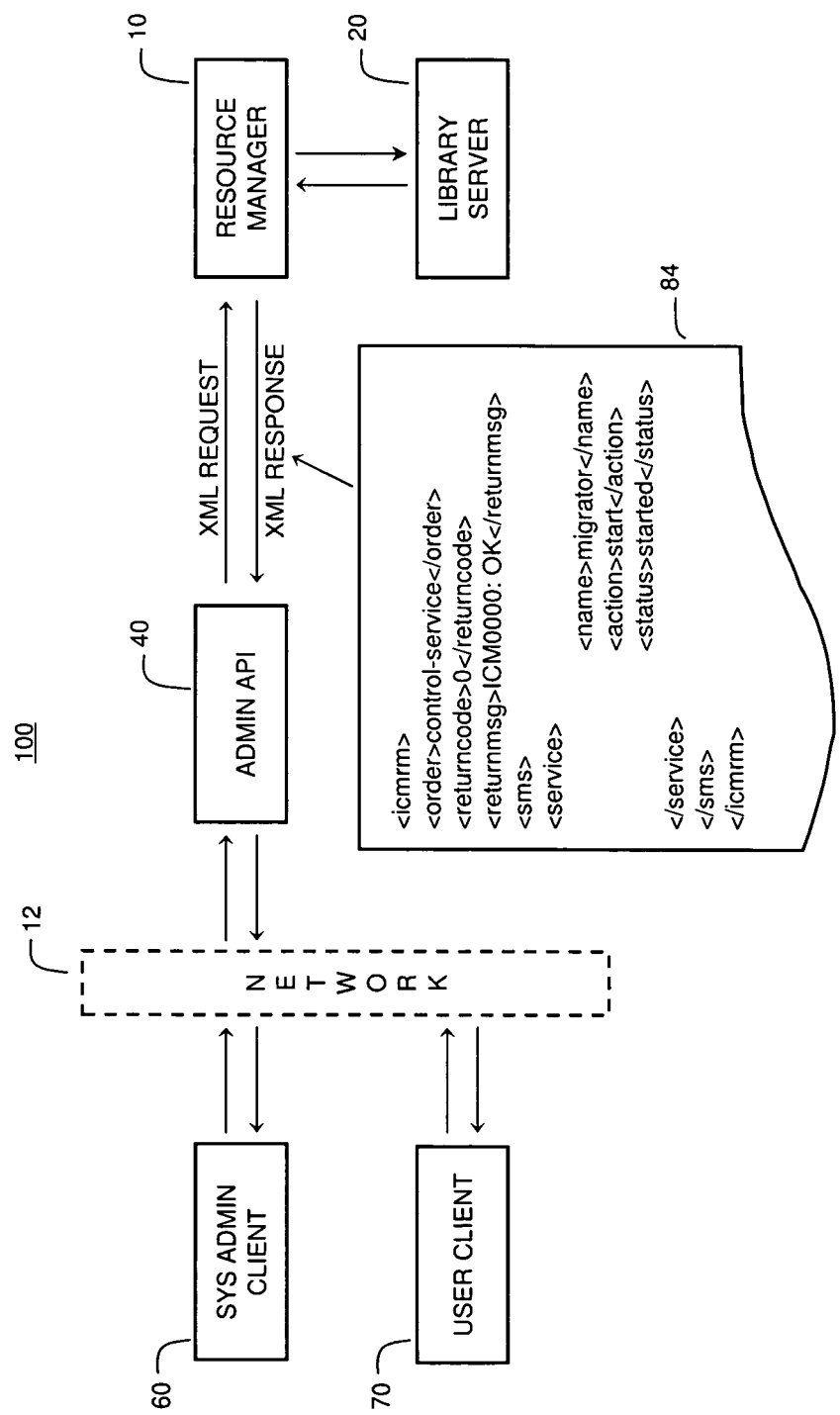
FIG. 3 is an exemplary implementation of an object-oriented method for controlling storage management services that may be used in the system of FIG. 1 in accordance with an embodiment of the present invention.

Referring now to FIGS. 2 and 3, in which an exemplary embodiment of the content management system 100 is shown (although several components such as the client API 30 are omitted from the depiction), a system administration API 40 comprised of a new class, e.g., DKRMControlServiceSMS, and associated methods, which control resource manager services for storage management. A class basically defines a collection of objects that share the same characteristics, and an object, or class member, is one instance of the class. A method in the object-oriented context is a procedure that is executed when an object receives a message to invoke the method. In other words, a method is similar to a procedure, function, or routine in procedural programming language, but in object-oriented programming, a method is always associated with a class.

The system administration API 40 may communicate with other components in the exemplary system 100 using extensible markup language (XML), for example by sending XML request document 82 with a service name and action to the resource manager 10, and by receiving XML response document 84 with the result/status of the action performed from the resource manager 10. These requests and responses may be exchanged in any suitable manner, for example via RSS, XML-RPC, SOAP, or any other suitable XML protocol, in conjunction with a transport protocol such as HTTP protocol with Secure Socket Layer (SSL), or any other suitable transport protocol.

Exemplary services utilized by the resource manager 10 include migrator, replicator, stager, and purger services. The migrator service checks migration policies and moves documents to the next storage class when they are scheduled to move. The replicator service creates one or more replicas for a document when it is first created, so that, for example, the primary document can be stored on one resource manager, and replicas can be stored on other resource managers in the system. Replicas provide added security by helping ensure that a document is available for retrieval or update even if the primary document's resource manager is down. The stager service moves a stored document from an offline or low-priority device back to an online or higher priority device, usually on demand of the system or on the request of a user. For example, when a user requests a document stored in permanent storage such as an archive database (not shown), a working copy is written to a working area such as a current resource manager 10. The purger service removes documents from the content management system 100.

With reference now to FIG. 2, a system administrator using the system administrator client 60, or any other client or application that is designed to work with the system administration API 40, can perform a variety of actions, for example stop, start, or status, on services such as those described above. The stop and start actions stop and start the service, respectively, and the status action retrieves the status of the service. The requested action is transformed by the system administration API 40 into an XML request message, for example XML request document 82 as shown in FIG. 2, which contains the following tags:

<order> indicating the order, e.g., "control-service";
<service> indicating the name of the service, and the action to be performed on the service;
<name> indicating the name of the service to be controlled, e.g., "migrator"; and
<action> indicating the action to be performed, e.g., "start".

The XML request document 82 is transmitted to the resource manager, which performs the requested action, and then returns an XML response document 84 to the system administration API 40, as shown in FIG. 3. Exemplary XML response document 84 contains the following tags:

<order> indicating the order, e.g., "control-service";
<returncode> indicating the return code, e.g., "0";
<returnmsg> displaying the return message, e.g., "ICM0000: OK";
<service> indicating the name of the service, the action to be performed on the service, and the status;
<name> indicating the name of the service controlled, e.g., "migrator";
<action> indicating the action performed, e.g., "start"; and
<status> indicating the status, e.g., "started".

Various exemplary actions and responses that may be applicable for the controlled services are set forth in Table 1 below:

TABLE 1

Exemplary Actions and Their Responses

| Action | Possible Responses | Meaning of Response |
|---|---|---|
| Start | Started | The service was started, or was already started. |
|  | Not Started | The request to start the service failed. |
| Stop | Stopped | The service was stopped, or was already stopped. |
|  | Not Stopped | The request to stop the service failed. |
| Status | Running | The service is running. |
|  | Sleeping | The service is sleeping. |
|  | Not Known | The status of the service is not known. |

In an embodiment of the invention, the system administration API 40 and its associated methods are implemented in the Java programming language. In this embodiment, a constructor DKRMControlServiceSMS is used to instantiate the dkRMStore class, and has the parameter rmStore, which is a dkRMStore object referred to a resource manager datastore, e.g., public DKRMControlServiceSMS (dkRMStore rmStore). SMS in this context refers to a System Managed Storage object. The constructor is associated with several methods, including setRMStore, getRMStore, and control:

setRMStore sets the reference to a resource manager datastore containing a particular SMS object, and has the parameter rmStore, e.g., public void setRMStore (dkRMStore rmStore);
  getRMStore gets the reference to a resource manager datastore containing a particular SMS object, and returns a dkRMStore object referred to a resource manager datastore, e.g., public dkRMStore getRMStore ( ); and
  control stops and/or stops various resource manager services, e.g., public DKRMConstantSMS.CONTROL_SERVICE_RESPONSE control (DKRMConstantSMS.CONTROL_SERVICE_NAME service, DKRMConstantSMS.CONTROL_SERVICE_ACTION action).

The control method takes a service name and action and sends an order to the resource manager to perform the action specified on the service indicated. The resource manager sends a response back that indicates the result or status of the action performed. Parameters for the control method are the service to be controlled, and the action to be performed on the service, both of which are chosen from an enum class, e.g., the service is chosen from enum CONTROL_SERVICE_NAME, and the action is chosen from enum CONTROL_SERVICE ACTION. The response is chosen from an enum class CONTROL_SERVICE_RESPONSE. Exemplary resource manager services that can be controlled include:
  Replicator (CONTROL_SERVICE_NAME.replicator);
  Migrator (CONTROL_SERVICE_NAME.migrator);
  Stager (CONTROL_SERVICE_NAME.stager); and
  Purger (CONTROL_SERVICE_NAME.purger).

The actions that can be performed on these services include, but are not limited to, those set forth in Table 1, for example stop (CONTROL_SERVICE_ACTION.stop) may be performed to stop a particular service. The response or status that can be returned in response to each action include, but are not limited to, those set forth in Table 1, for example in response to the action stop, a return can be made to indicate that the service was not stopped, e.g., (CONTROL_SERVICE_RESPONSE.not-stopped).

Exemplary code illustrating this embodiment is included herein as a reference, and is not necessarily syntactically correct:

```
    dsICM = new DKDatastoreICM( );
    dsICM.connect(db, userid, pw,"");
    System.out.println("datastore connected.");
    DKRMStoreDefSMS rmStoreDef =   null;
    DKRMServerDefinitionDefSMS __serverdefObj = null;
    DKRMConfigurationMgmtICM __rmCfgMgmt = new
DKRMConfigurationMgmtICM(dsICM);
    String[ ] rmNames = __rmCfgMgmt.listResourceMgrNames( );
    DKResourceMgrDefICM __resMgrDef =
(DKResourceMgrDefICM)__rmCfgMgmt.-
retrieveResourceMgr(rmNames[0]);
    System.out.println(rmNames[0]);
    DKRMStoreSMS __rmStoreSMS =
    new DKRMStoreSMS(__resMgrDef);
    __rmStoreSMS.connect(__resMgrDef, "");
    DKRMControlServiceSMS controlService = new
DKRMControlServiceSMS(__rmStoreSMS);
    // Get the status of service
    DKRMConstantSMS.CONTROL_SERVICE_RESPONSE
response = DKRMConstantSMS.CONTROL_SERVICE_RESPONSE.-
not_known;
    System.out.println("****** Before calling control( ) with " +
service + "/status, response = " + response);
    response = controlService.control(service,
DKRMConstantSMS.CONTROL_SERVICE_ACTION.status);
    System.out.println("****** After calling control( ) with " +
service + "/status, response = " + response);
```

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C++, Python, Java, or PHP programming languages, data storage may be implemented in MySQL, Oracle, SQL Server, IBM DB2, Informix or a flat database, etc. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention may be distributed in any manner among the content management system, resource managers, and end-user systems. The software and/or algorithms described above and illustrated in the flow charts may be modified in any manner that accomplishes the functions described herein. In addition, the functions in the flow charts or description may be performed in any order that accomplishes a desired operation.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The software may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.).

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the access control processing system to become coupled to other processing systems or remote printers or storage devices through intervening private or public networks. Modems, cable modem and Ethernet cards are just a few of the currently available types of network adapters.

End-user systems may be implemented by any quantity of conventional or other computer systems or devices (e.g., computer terminals, personal computers (e.g., IBM-compatible, Apple MacIntosh, tablet, laptop, etc.), cellular telephone, personal data assistant (e.g., Palm Pilot, Treo, iPhone, etc.), etc.) and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information. The end-user systems may be local to the process and data storage areas, or remote from and in communication with the access control process and data storage areas via a network.

Networks may be implemented by any quantity of any suitable communications media (e.g., WAN, LAN, Internet, Intranet, wired, wireless, etc.). The computer systems of the present invention embodiments may include any conventional or other communications devices to communicate over the networks via any conventional or other protocols, and may utilize any type of connection (e.g., wired, wireless, etc.) for access to the network.

It will be appreciated that the embodiments described above and illustrated in the drawings represent only a few of the many ways of implementing remote control of storage management services in a content management system. Having described preferred embodiments of a new and improved content management system, and method for remotely controlling storage management services of resource managers in such a system, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of remotely administering storage management services in a content management system, comprising:
   providing an object-oriented system administration class that defines an object-oriented administration method capable of acting on a storage management service in a server;
   generating, responsive to a request from a client, an extensible markup language (XML) request document naming the administration method, the storage management service, and an action to be taken on the service; and
   sending the XML request document to the server.

2. The method of claim 1, wherein the administration method is a Java public method.

3. The method of claim 1, wherein the administration method is one of a set request or a get request.

4. The method of claim 1, wherein the storage management service is a replicator service, a migrator service, a stager service, or a purger service.

5. The method of claim 1, wherein said sending step comprises posting the XML request document using HTTP.

6. The method of claim 1, wherein said sending step is performed according to the XML-RPC protocol or the SOAP protocol.

7. The method of claim 1, further comprising receiving an extensible markup language (XML) response document from the server, which names a result of the action taken by the administration method on the storage management service.

8. The method of claim 7, wherein the administration method is a control request.

9. The method of claim 8, wherein the action to be taken on the service is a stop request, a start request, or a status request.

10. The method of claim 7, wherein said receiving step comprises receiving the XML response document via an HTTP post.

11. A computer program product comprising a non-transitory computer useable medium having a computer readable program stored thereon, wherein the computer readable program when executed on a computer causes the computer to:
   provide an object-oriented system administration class that defines an object-oriented administration method capable of acting on a storage management service in a server to manage electronic information stored in a memory;
   generate, responsive to a request from a client, an extensible markup language (XML) request document naming the administration method, the storage management service, and an action to be taken on the service; and send the XML request document to the server.

12. The computer program product of claim 11, wherein the administration method is one of a set request, a get request, or a control request.

13. The computer program product of claim 11, wherein the storage management service is a replicator service, a migrator service, a stager service, or a purger service.

14. The computer program product of claim 11, wherein said sending comprises posting the XML request document using HTTP.

15. The computer program product of claim 11, wherein the action to be taken on the service is a stop request, a start request, or a status request.

16. The computer program product of claim 11, further comprising causing the computer to receive, from the server, an XML response document naming a result of the action.

17. The computer program product of claim 16, wherein said receiving comprises receiving the XML response document via an HTTP post.

18. The computer program product of claim 16, wherein said sending and said receiving is performed according to the XML-RPC protocol or the SOAP protocol.

19. A system for managing electronic information, comprising:

a memory;

a resource manager for storing electronic information in the memory and for performing a service to manage the stored electronic information;

a system administration client for remotely administering the service; and an application program interface for communicating between said system administration client and said resource manager, wherein the application program interface comprises an obiect-oriented system administration class that defines an obiect-oriented administration method capable of acting on the service, wherein the application program interface is configured to send an extensible markup language (XML) request document naming an action to be taken on the service to the resource manager responsive to an administration request from the system administration client, and to receive an XML response document from the resource manager naming a result of the action.

20. The system of claim 19, wherein the storage management service is a replicator service, a migrator service, a stager service, or a purger service.

21. The system of claim 19, wherein the action to be taken on the service is a stop request or a start request.

22. The system of claim 19, wherein the action to be taken on the service is a status request.

23. The system of claim 19, wherein said sending comprises posting the XML request document using HTTP, and said receiving comprises receiving the XML response document via an HTTP post.

24. The system of claim 19, wherein said sending and said receiving is performed according to the XML-RPC protocol or the SOAP protocol.

* * * * *